United States Patent
Oshiro et al.

[11] Patent Number: 5,910,328
[45] Date of Patent: *Jun. 8, 1999

[54] CLAMPING APPARATUS FOR PRECISE INJECTION MOLDING

[75] Inventors: Takeo Oshiro; Masao Hirosawa; Hiroshi Kanno; Hidekazu Nakamura; Yasuyuki Ono; Takashi Goto; Naoki Yamamoto, all of Shizuoka-ken, Japan

[73] Assignee: Toshiba Kikai Kabushiki Kaisha, Tokyo, Japan

[*] Notice: This patent is subject to a terminal disclaimer.

[21] Appl. No.: 08/804,082

[22] Filed: Feb. 21, 1997

[30] Foreign Application Priority Data

Feb. 22, 1996 [JP] Japan ................................. 8-035157
Apr. 10, 1996 [JP] Japan ................................. 8-088343

[51] Int. Cl.$^6$ .................................................. B29C 45/67
[52] U.S. Cl. ..................................... 425/595; 425/451.9
[58] Field of Search ..................................... 425/590, 595, 425/541.2, 451.9

[56] References Cited

U.S. PATENT DOCUMENTS

| | | | |
|---|---|---|---|
| 3,554,087 | 1/1971 | Florjancic | 425/590 |
| 3,905,742 | 9/1975 | McCarty | 425/451.2 |
| 3,951,579 | 4/1976 | Myers et al. | 425/590 |
| 4,230,442 | 10/1980 | Rees et al. | 425/595 |
| 4,599,063 | 7/1986 | Gutjahr | 425/590 |
| 4,846,664 | 7/1989 | Hehl | 425/590 |
| 4,861,259 | 8/1989 | Takada | 425/595 |
| 5,008,052 | 4/1991 | Harada | 425/590 |
| 5,133,655 | 7/1992 | Schad et al. | 425/590 |
| 5,593,711 | 1/1997 | Glaesener | 425/595 |

Primary Examiner—James P. Mackey
Attorney, Agent, or Firm—Finnegan, Henderson, Farabow, Garrett & Dunner, L.L.P.

[57] ABSTRACT

A stationary platen for holding a stationary part of a mold centered to an injection axis is securely connected by tie-rods to a cylinder body integral with a cylinder part of a clamp cylinder which moves a movable part of the mold in a clamp direction, and subjected to a deformation when the mold is clamped, which deformation is made symmetrical with respect to a reference plane including the injection axis by a combination of mechanisms therefor.

19 Claims, 12 Drawing Sheets

CLAMPING APPARATUS FOR PRECISE INJECTION MOLDING

BACKGROUND OF THE INVENTION

1. Field of the Invention

The present invention generally relates to a clamping apparatus for clamping a mold for injection molding (hereafter sometimes simply "mold"), and particularly, it relates to a clamping apparatus for a precise injection molding, which has a stationary part of a mold (hereafter "stationary mold") held by a stationary platen and a movable part of the mold (hereafter "movable mold") held by a movable platen and which performs a clamping between the stationary mold and the movable mold (hereafter sometimes "clamping of a mold" or simply "clamping"), as they are closely fitted to each other.

Further, the invention relates to a clamping apparatus for a precise injection molding that includes a stationary platen for holding a stationary mold, a cylinder actuator for moving a movable mold relative to the stationary mold to effect a clamping therebetween (hereafter simply "clamp cylinder"), a cylinder member of the clamp cylinder and/or one or more members integral therewith (hereafter collectively "cylinder body"), and a plurality of tie-rods interconnecting the stationary platen and the cylinder body, bearing reaction forces of the clamping.

2. Description of Relevant Art

FIG. 1 is a front view of a conventional clamping apparatus. As shown in FIG. 1, the conventional clamping apparatus includes a longitudinally extending frame 1 as a base thereof, a stationary platen 5 longitudinally slidably mounted thereon for holding a stationary mold 3, and a movable platen 7 longitudinally movable relative to the stationary platen 5. The movable platen 7 has a movable mold 11 held on a side thereof opposing the stationary platen 5, which movable mold 11 has a right face 11a in the figure cooperative with a left face 3a of the stationary mold 3 to define a space therebetween as a cavity for a molding.

The movable platen 7 is fixedly attached to an end portion 17a of a clamp ram 17 constituting an actuating part of a clamp cylinder 15, which is supported by a cylinder support 13 fixed to the frame 1.

As the clamp cylinder 15 is operated, the clamp ram 17 has an increasing or decreasing projection length, moving the movable platen 7 to advance close to or retreat away from the stationary platen 5. Between the stationary platen 5 and the cylinder support 13, there are provided a plurality of tie-rods 19 for a secure interconnection, which tie-rods 19 serve for longitudinally guiding the movable platen 7 in advance and retreat movements. At a righthand of the stationary platen 5, there is facing an injection nozzle 21 for injecting molten resin into the cavity to be defined between the stationary and movable molds 3, 11 after their clamping.

In the conventional clamping apparatus, as the clamp ram 17 is forced to extend by the clamp cylinder 15, the movable platen 7 advances as shown in FIG. 2, bringing the movable mold 11 into a close fitting with the stationary mold 13, where the mold is clamped, which clamping is performed with forces overcoming pressures of the molten resin injected inside the cavity, accompanying reaction forces pushing the stationary platen 5 rightwardly in the figure, with which forces the tie-rods 19 bear, deforming with an elongation, causing the stationary platen 5 and the cylinder support 13 to yield with their deformations, which deformations restrict each other.

In this respect, in the conventional apparatus, the cylinder support 13 stands as a cantilever member fixed at a lower end to the frame 1, with a tendency to have a yielding deformation of such a configuration 13a as illustrated by double-dash chain lines in FIG. 2, causing the stationary platen 5 to additionally deform in a rightwardly tilting manner. Accordingly, the stationary platen 5 has an increased sliding resistance to the frame 1 so that its sliding is additionally restricted in the clamping, with an increased tilting tendency, thus deforming with a vertically asymmetrical configuration 5a, resulting in a vertically asymmetrical distribution of deviations in terms of a parallelism between the stationary platen 5 and the movable platen 7.

Further, upper ones 19-1 of the tie-rods 19 are deformed in a different manner to lower ones 19-2, causing the movable platen 7 guided for movement by the respective tie-rods 19-1 and 19-2 to deform with deviations in parallelism to the stationary platen 5, with an increased vertical asymmetry.

Such deviations in parallelism between the platens 5, 7 adversely affects a clamping accuracy of the molds 3, 11, resulting in a non-conforming article, particularly in a precise injection molding needing a high accuracy, such as for production of an optical disc, e.g., a compact disc or a digital video disc.

FIG. 3 is a view along an arrow X of FIG. 1, as the stationary platen 5 is seen from an injection side. The stationary platen 5 is configured with a four-sided substantially rectangular shape, having at four corners thereof upper and lower pairs of left and right tie-rods 19-1a, 19-1b and 19-2a, 19-2b screwed to be securely fastened thereto by four nuts 9, respectively. All the nuts 9 have a righthanded screw tightening direction Y, i.e. clockwise in the figure.

Accordingly, when the nuts 9 are tightened, the respective corners of the stationary platen 5 have clockwise moments Z1, Z2, Z3, Z4 exerted thereon, so that an entirety of the platen 5 always has a superimposed clockwise moment Z acting thereon, needing time-consuming work for establishment and maintenance of its parallelism, whose negligence will adversely affect a clamping accuracy of mold, thus resulting in a non-conforming article, particularly in a precise injection molding, as described.

SUMMARY OF THE INVENTION

The present invention has been achieved with such points in mind. It therefore is an object of the present invention to provide a clamping apparatus for a precise injection molding, permitting a preferable clamping accuracy of mold to be kept.

To achieve the object, according to a first aspect of the invention, there is provided a clamping apparatus for clamping a mold in a clamp direction thereof, the clamping apparatus being mounted on a base frame, the clamping apparatus comprising: a stationary platen for holding a stationary part of the mold; a movable platen for holding a movable part of the mold; a clamp cylinder for moving the movable platen in the clamp direction; a cylinder body integral with a cylinder part of the clamp cylinder: a tie-rod for securely connecting an upper part of the stationary platen to an upper part of the cylinder body; a tie-rod for securely connecting a lower part of the stationary platen to a lower part of the cylinder body; first means for fixing a central part of the cylinder body between the upper and lower parts thereof relative to the base frame; and second means for supporting a central part of the stationary platen between the upper and lower parts thereof to be slidable in the clamp direction relative to the base frame.

According to the first aspect, as a clamp cylinder is operated, a movable platen is pushed toward a stationary platen to effect a clamping, accompanying reaction forces thereto, with which tie-rods bear, having a mutual pulling effect developed between the stationary platen which is supported to be slidable relative to a base frame at a vertically central part thereof and a cylinder body of the clamp cylinder which is fixed relative to the base frame at a vertically central part thereof, so that the stationary platen and the cylinder body deform in a vertically symmetrical manner, making-vertically symmetrical deviations in parallelism between the stationary and movable platens, permitting a favorable application to a precise injection molding needing a high accuracy.

According to a second aspect of the invention, as it depends from the first aspect, the cylinder body has a cylinder support part extending along a vertical plane crossing the clamp direction; the first means comprises: a pair of first projections provided at both lateral sides of the cylinder support part; a pair of first legs fixed relative to the base frame; and a first mechanism for fixing the pair of first projections to the pair of first legs; and the second means comprises: a pair of second projections provided at both lateral sides of the stationary platen; a pair of second legs fixed relative to the base frame; and a second mechanism for holding the pair of second projections to the pair of second legs, to be slidable in the clamp direction.

According to the second aspect, a cylinder body is supported by a pair of first legs, and a stationary platen is supported by a pair of second legs.

Moreover, to achieve the object, according to a third aspect of the invention, there is provided a clamping apparatus for clamping a mold in a clamp direction thereof, the clamping apparatus being mounted on a base frame, the clamping apparatus comprising: a stationary platen for holding a stationary part of the mold; a mechanism for supporting the stationary platen to be slidable in the clamp direction; a movable platen for holding a movable part of the mold; a clamp cylinder for moving the movable platen; a cylinder body integral with a cylinder part of the clamp cylinder; a mechanism for fixing the cylinder body relative to the base frame; a tie-rod for securely connecting the stationary platen to the cylinder body; and means for guiding the movable platen in the clamp direction, the means comprising: a clamp ram fitted to the cylinder part; a bush member fitted between the cylinder part and the clamp ram; and a linear guide mechanism interposed between the stationary platen and the base frame.

According to the third aspect, a movable platen is supported in a guiding manner by a linear guide mechanism bearing a weight loaded therefrom, and is additionally guided by a bush member fitted between a clamp ram and a cylinder part of a clamp cylinder so that it moves in a clamp direction in which it approaches to or recede from a stationary platen, thus having an improved parallelism to the stationary platen.

Further, to achieve the object, according to a fourth aspect of the invention, there is provided a clamping apparatus for clamping a mold in a clamp direction thereof, the clamping apparatus being mounted on a base frame, the clamping apparatus comprising: a stationary platen for holding a stationary part of the mold; a movable platen for holding a movable part of the mold; a clamp cylinder for moving the movable platen; a cylinder body integral with a cylinder part of the clamp cylinder, the cylinder body having a cylinder support part extending along a vertical plane crossing the clamp direction; a tie-rod for securely connecting an upper part of the stationary platen to an upper part of the cylinder body; a tie-rod for securely connecting a lower part of the stationary platen to a lower part of the cylinder body; first means for fixing a central part of the cylinder body between the upper and lower parts thereof relative to the base frame, the first means comprising a pair of first projections provided at both lateral sides of the cylinder support part, a pair of first legs fixed relative to the base frame, and a first mechanism for fixing the pair of first projections to the pair of first legs; second means for supporting a central part of the stationary platen between the upper and lower parts thereof to be slidable in the clamp direction relative to the base frame, the second means comprising a pair of second projections provided at both lateral sides of the stationary platen, a pair of second legs fixed relative to the base frame, and a second mechanism for holding the pair of second projections to the pair of second legs, to be slidable in the clamp direction; third means for guiding the movable platen in the clamp direction, the third means comprising a clamp ram fitted to the cylinder part, a bush member fitted between the cylinder part and the clamp ram, and a linear guide mechanism interposed between the stationary platen and the base frame; and a base member fixed to the base frame, the base member being integral with the pair of first legs and the pair of second legs, the base member supporting the linear guide mechanism.

According to the fourth aspect, a base member fixed to a base frame constitutes a common mount member to a pair of legs supporting a cylinder support part of a clamp cylinder, a pair of legs supporting a stationary platen, and a linear guide mechanism supporting a movable platen, permitting a reduced assembly error.

Furthermore, to achieve the object, according to a fifth aspect of the invention, there is provided a clamping apparatus for clamping a mold in a clamp direction thereof, the clamping apparatus being mounted on a base frame, the clamping apparatus comprising: a stationary platen for holding a stationary part of the mold; a mechanism for supporting the stationary platen to be slidable in the clamp direction; a movable platen for holding a movable part of the mold; a clamp cylinder for moving the movable platen in the clamp direction; a cylinder body integral with a cylinder part of the clamp cylinder; a mechanism for fixing the cylinder body relative to the base frame; a tie-rod for securely connecting the stationary platen to the cylinder body; and means for closing the mold in the clamp direction and opening the same in a reverse direction thereto, the means comprising: a clamp ram fitted in the cylinder part; a piston member fitted in the clamp ram; a mechanism for fixing the piston member to the cylinder body; and the movable platen being connected to the clamp ram.

According to the fifth aspect, a ram for a clamping is adapted to concurrently serve as a mold open-close cylinder, permitting transitions to be smooth from a mold close action via the clamping to a mold open action.

According to a sixth aspect of the invention, as it depends from the fifth aspect, the piston member comprises a piston slidable relative to a cylinder chamber in the clamp ram, a first rod provided on one side of the piston, the first rod projecting outside of the cylinder chamber, and a second rod provided on the other side of the piston, the second rod projecting outside of the cylinder chamber; said means has pressure fluid circuitry adaptive for driving the clamp ram in the clamp direction and in the reverse direction, the pressure fluid circuitry including: a first pressure acting chamber defined by the cylinder chamber, the piston and the first rod;

and a second pressure acting chamber defined by the cylinder chamber, the piston and the second rod; and the first and second rods have an identical cross sectional area to each other.

According to the sixth aspect, pressure acting areas at both sides of a piston are rendered equivalent to each other, permitting an application of a servo valve with an excellent responsibility in change from a high speed to a low speed, achieving a time-reduced low-speed period for a clamping.

Still more, to achieve the object, according to a seventh aspect of the invention, there is provided a clamping apparatus for clamping a mold in a clamp direction thereof, the clamping apparatus being mounted on a base frame, the clamping apparatus comprising: a stationary platen for holding a stationary part of the mold; a mechanism for supporting the stationary platen to be slidable in the clamp direction; a movable platen for holding a movable part of the mold; a clamp cylinder for moving the movable platen in the clamp direction; a cylinder body integral with a cylinder part of the clamp cylinder; a mechanism for fixing the cylinder body relative to the base frame; a tie-rod for securely connecting the stationary platen to the cylinder body; and means for closing the mold in the clamp direction and opening the same in a reverse direction thereto, the means comprising: a first cylinder chamber formed in the cylinder part; a clamp ram loose-fitted in the first cylinder chamber; the movable platen being connected to the clamp ram; a second cylinder chamber formed in the clamp ram; a rod member slidably fitted in the second cylinder chamber; a mechanism for fixing the rod member to the cylinder body; and pressure fluid circuitry adaptive for driving the clamp ram in the clamp direction and in the reverse direction, the pressure fluid circuitry including: a first pressure acting chamber defined by the first cylinder chamber, an outer circumferential part of the clamp ram, and a piston part on the outer circumferential part of the clamp ram; a second pressure acting chamber defined by the second cylinder chamber, and an end face of the rod member; and a fluid path formed in the rod member, the fluid path communicating with the second pressure acting chamber.

According to the seventh aspect, a first pressure acting chamber is defined between an inner circumference of a cylinder part and an outer circumference of a clamp ram, and a second pressure acting chamber is defined between an inside of the clamp ram and an end face of a rod member fitted therein. The first and second pressure acting chambers are either adaptive for both of operations to open and close a mold, with an improved control accuracy such as for a speed change or stop in transitions from a mold close action via a clamping to a mold open action.

According to an eighth aspect of the invention, as it depends from the seventh aspect, the first and second pressure acting chambers have an identical cross sectional area to each other.

According to the eighth aspect, there is permitted a concurrent use of a servo valve with an excellent responsibility in change from a high speed to a low speed, achieving a time-reduced low-speed period for a clamping.

According to a ninth aspect of the invention, as it depends from the seventh aspect, the clamping apparatus further comprises guide means for guiding the movable platen in the clamp direction, the guide means including: a first bush member interposed between the cylinder part and and the clamp ram; and a second bush member interposed between the clamp ram and the rod member.

According to the ninth aspect, a first bush member is interposed between an inner circumference of a cylinder part and an outer circumference of a clamp ram, and a second bush member is interposed between an inner circumference of the clamp ram and an outer circumference of a rod member. The bush members are cooperative to guide a movable platen with a favorable accuracy, as the movable platen moves to approach to or recede from a stationary platen, permitting an improved parallelism therebetween.

Yet more, to achieve the object, according to a tenth aspect of the invention, there is provided a clamping apparatus for clamping a mold in a clamp direction thereof, the clamping apparatus comprising: a stationary platen for holding a stationary part of the mold; a clamp cylinder for moving a movable part of the mold in the clamp direction; a cylinder body integral with a cylinder part of the clamp cylinder; a first tie-rod and a second tie-rod for connecting the stationary platen to the cylinder body, respectively; and means for securely fastening the first tie-rod and the second tie-rod to a peripheral part of the stationary platen, as they are provided therethrough, the means comprising; a first thread part formed at an end of the first tie-rod; a first fastening member engageable with the first thread part in a first rotational direction; a second thread part formed at an end of the second tie-rod; and a second fastening member engageable with the second thread part in a second rotational direction different from the first rotational direction.

According to the tenth aspect, an entirety of an associated stationary platen portion is kept from suffering moments identical in direction, when first and second fastening members are tightened, and hence is permitted to have a suppressed torsional moment acting thereon.

According to an eleventh aspect of the invention, as it depends from the tenth aspect, the peripheral part of the stationary platen has a rectangular form; the first tie-rod is arranged at a first corner of the rectangular form; and the second tie-rod is arranged at a second corner of the rectangular form adjacent to the first corner.

According to the eleventh aspect, a second tie-rod is arranged at either of two corners neighboring a first corner.

According to a twelfth aspect of the invention, as it depends from the tenth aspect, the first thread part comprises a first male thread; the first fastening member comprises a nut screwable to the first male thread; the second thread part comprises a second male thread different from the first male thread in screw direction; and the second fastening member comprises a nut screwable to the second male thread.

According to the twelfth aspect, associated nuts have different screw tightening directions.

Still further, to achieve the object, according to a thirteenth aspect of the invention, there is provided a clamping apparatus for clamping a mold in a clamp direction thereof, the mold being centered to an injection axis, the clamping apparatus comprising: a stationary platen for holding a stationary part of the mold; a clamp cylinder for moving a movable part of the mold in the clamp direction; a cylinder body integral with a cylinder part of the clamp cylinder; a tie-rod for securely connecting the stationary platen to the cylinder body; and first symmetrization means for making a deformation of the stationary platen due to the clamping symmetrical with respect to a reference plane including the injection axis.

According to the thirteenth aspect, a stationary platen for holding a stationary part of a mold centered to an injection axis is securely connected by a tie-rod to a cylinder body integral with a cylinder part of a clamp cylinder which moves a movable part of the mold in a clamp direction, and subjected to a deformation when the mold is clamped, which deformation is made symmetrical with respect to a reference plane including the injection axis by a combination of mechanisms therefor, in terms of a symmetry such as by a rotation (e.g. FIG. 12) about the injection axis, a reflection (e.g. FIG. 9) in respect of the reference plane, and/or a rotary reflection with respect to the injection axis and a perpendicular plane thereto, e.g. between a fastened peripheral portion of the stationary platen and a free or unfastened peripheral portion thereof.

According to a fourteenth aspect of the invention, as it depends from the thirteenth aspect, the clamping apparatus is mounted on a base frame; the clamping apparatus further comprises: upper said tie-rod for securely connecting an upper part of the stationary platen to an upper part of the cylinder body; lower said tie-rod for securely connecting a lower part of the stationary platen to a lower part of the cylinder body; and the first symmetrization means comprises: first support means for fixing, in the reference plane, a central part of the cylinder body between the upper and lower parts thereof relative to the base frame; and second support means for supporting, in the reference plane, a central part of the stationary platen between the upper and lower parts thereof to be slidable in the clamp direction relative to the base frame.

According to the fourteenth aspect, there are achieved similar effects to the first aspect.

According to a fifteenth aspect of the invention, as it depends from the thirteenth aspect, the clamping apparatus has first said tie-rod and second said tie-rod symmetrical to each other with respect to the injection axis; and the first symmetrization means comprises fastening means for securely fastening the first tie-rod and the second tie-rod to a peripheral part of the stationary platen, as they are provided therethrough, the fastening means comprising; a first thread part formed at an end of the first tie-rod; a first fastening member engageable with the first thread part in a first rotational direction; a second thread part formed at an end of the second tie-rod; and a second fastening member engageable with the second thread part in a second rotational direction different from the first rotational direction.

According to the fifteenth aspect, there are achieved similar effects to the tenth aspect.

According to a sixteenth aspect of the invention, as it depends from the thirteenth aspect, the clamping apparatus further comprises: a movable platen for holding a movable part of the mold; the clamp cylinder being operable for moving the movable platen to move the movable part of the mold in the clamp direction; and second symmetrization means for making a deformation of the movable platen due to the clamping symmetrical with respect to the reference plane.

According to the sixteenth aspect, a movable platen is subjected to a deformation when a mold is clamped, which deformation is made symmetrical with respect to a reference plane including an injection axis by a combination of mechanisms therefor, in terms of a symmetry such as by a rotation (e.g. FIG. 8) about the injection axis, a reflection (e.g. FIGS. 10, 11) in respect of the reference plane, and/or a rotary reflection with respect to the injection axis and a perpendicular plane thereto, e.g. between a projecting corner portion of the movable platen and a recessed corner portion thereof (cf. FIG. 8).

According to a seventeenth aspect of the invention, as it depends from the sixteenth aspect, the clamping apparatus is mounted on a base frame; the clamping apparatus further comprises a mechanism for supporting the stationary platen to be slidable in the clamp direction, and a mechanism for fixing the cylinder body relative to the base frame; and the second symmetrization means comprises guide means for guiding the movable platen in the clamp direction, the guide means comprising: a clamp ram fitted to the cylinder part; a bush member fitted between the cylinder part and the clamp ram; and a linear guide mechanism interposed between the stationary platen and the base frame.

According to the seventeenth aspect, there are achieved similar effects to the third aspect.

According to an eighteenth aspect of the invention, as it depends from the sixteenth aspect, the clamping apparatus is mounted on a base frame; the clamping apparatus further comprises a mechanism for supporting the stationary platen to be slidable in the clamp direction, and a mechanism for fixing the cylinder body relative to the base frame; and the second symmetrization means comprises actuation means for closing the mold in the clamp direction and opening the same in a reverse direction thereto, the actuation means comprising: a clamp ram fitted in the cylinder part; a piston member fitted in the clamp ram; a mechanism for fixing the piston member to the cylinder body; and the movable platen being connected to the clamp ram.

According to the eighteenth aspect, there are achieved similar effects to the fifth aspect.

According to a nineteenth aspect of the invention, as it depends from the sixteenth aspect, the clamping apparatus is mounted on a base frame; the clamping apparatus further comprises a mechanism for supporting the stationary platen to be slidable in the clamp direction, and a mechanism for fixing the cylinder body relative to the base frame; and the second symmetrization means comprises actuation means for closing the mold in the clamp direction and opening the same in a reverse direction thereto, the actuation means comprising: a first cylinder chamber formed in the cylinder part; a clamp ram loose-fitted in the first cylinder chamber; the movable platen being connected to the clamp ram; a second cylinder chamber formed in the clamp ram; a rod member slidably fitted in the second cylinder chamber; a mechanism for fixing the rod member to the cylinder body; and pressure fluid circuitry adaptive for driving the clamp ram in the clamp direction and in the reverse direction, the pressure fluid circuitry including: a first pressure acting chamber defined by the first cylinder chamber, an outer circumferential part of the clamp ram, and a piston part on the outer circumferential part of the clamp ram; a second pressure acting chamber defined by the second cylinder chamber, and an end face of the rod member; and a fluid path formed in the rod member, the fluid path communicating with the second pressure acting chamber.

According to the nineteenth aspect, there are achieved similar effects to the seventh aspect.

BRIEF DESCRIPTION OF THE
ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
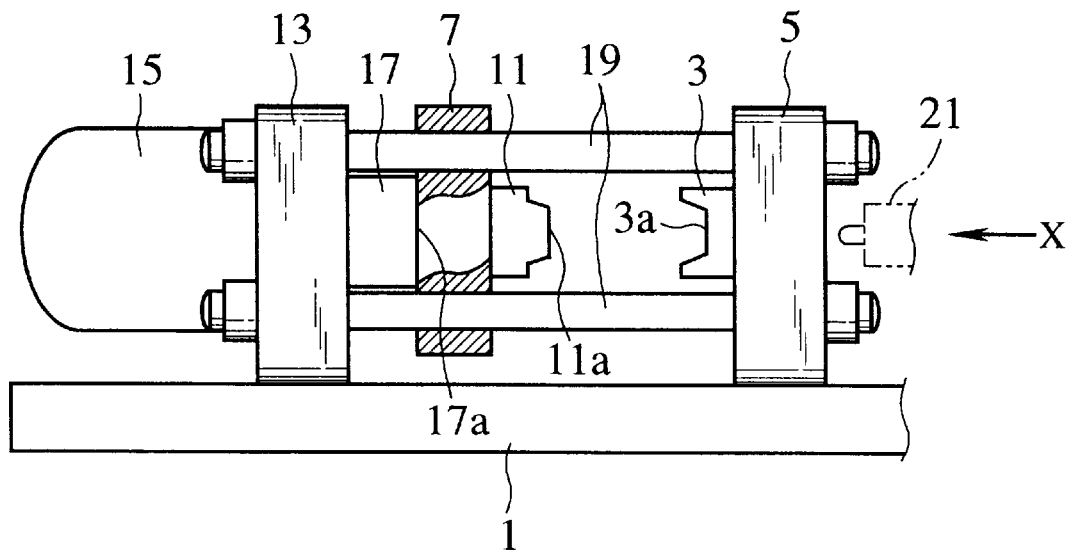
FIG. 1 is a front view of a conventional clamping apparatus.
Figure 2:
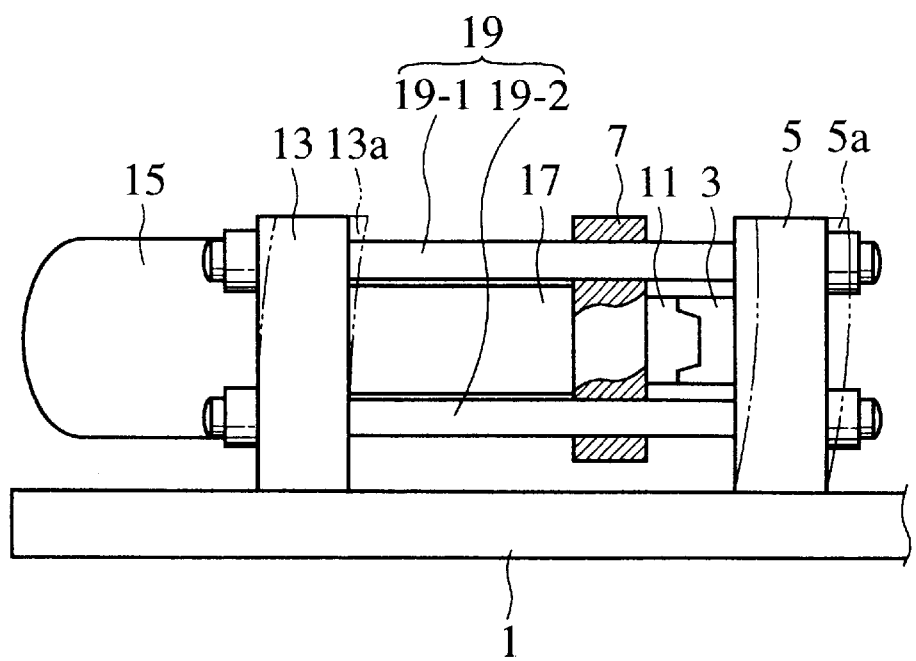
FIG. 2 is an illustration describing actions of the clamping apparatus of FIG. 1.
Figure 3:
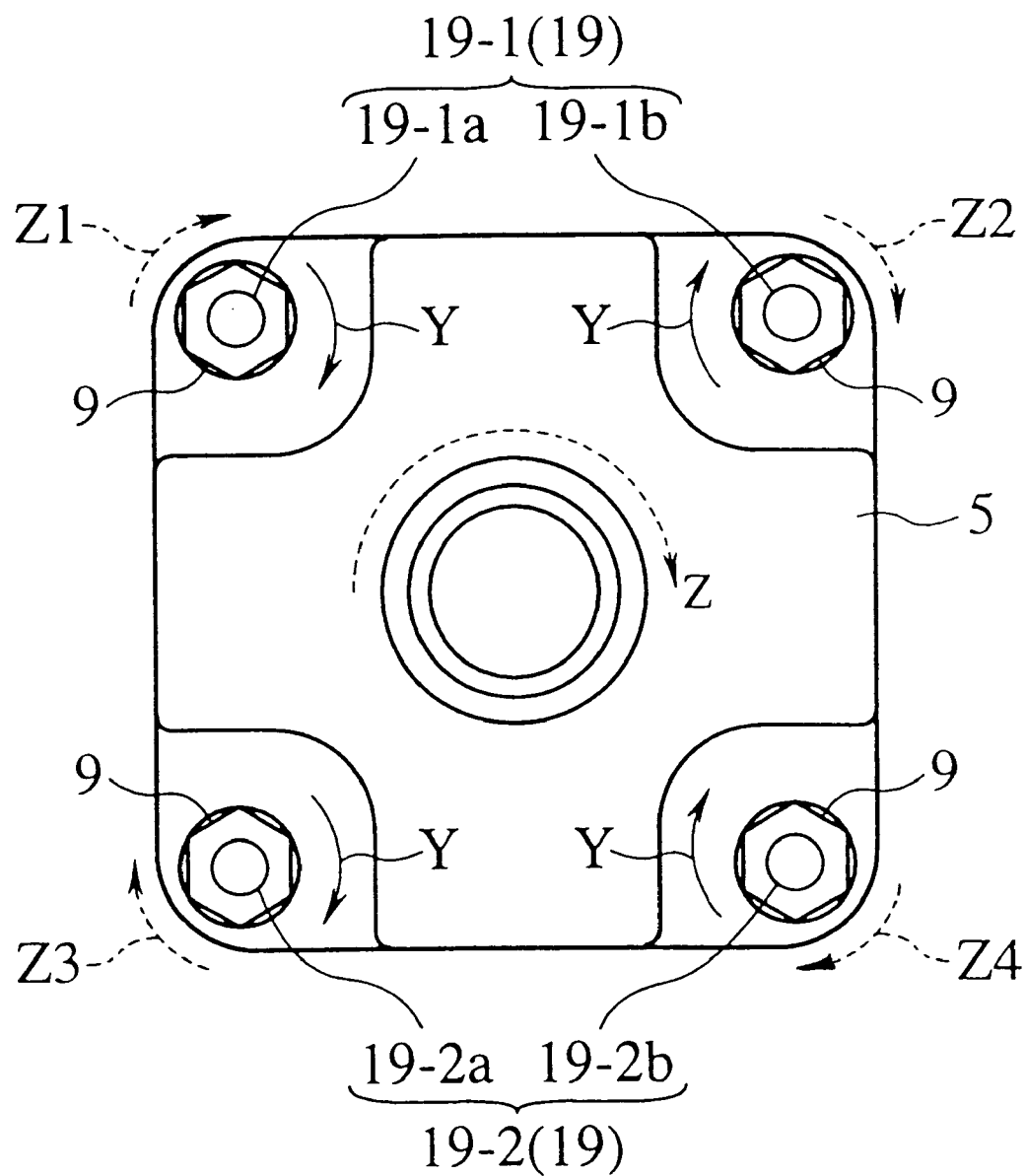
FIG. 3 is a view along an arrow X of the clamping apparatus of FIG. 1.

There will be detailed below the preferred embodiments of the present invention with reference to the accompanying drawings. Like members are designated by like reference characters.

Figure 4:
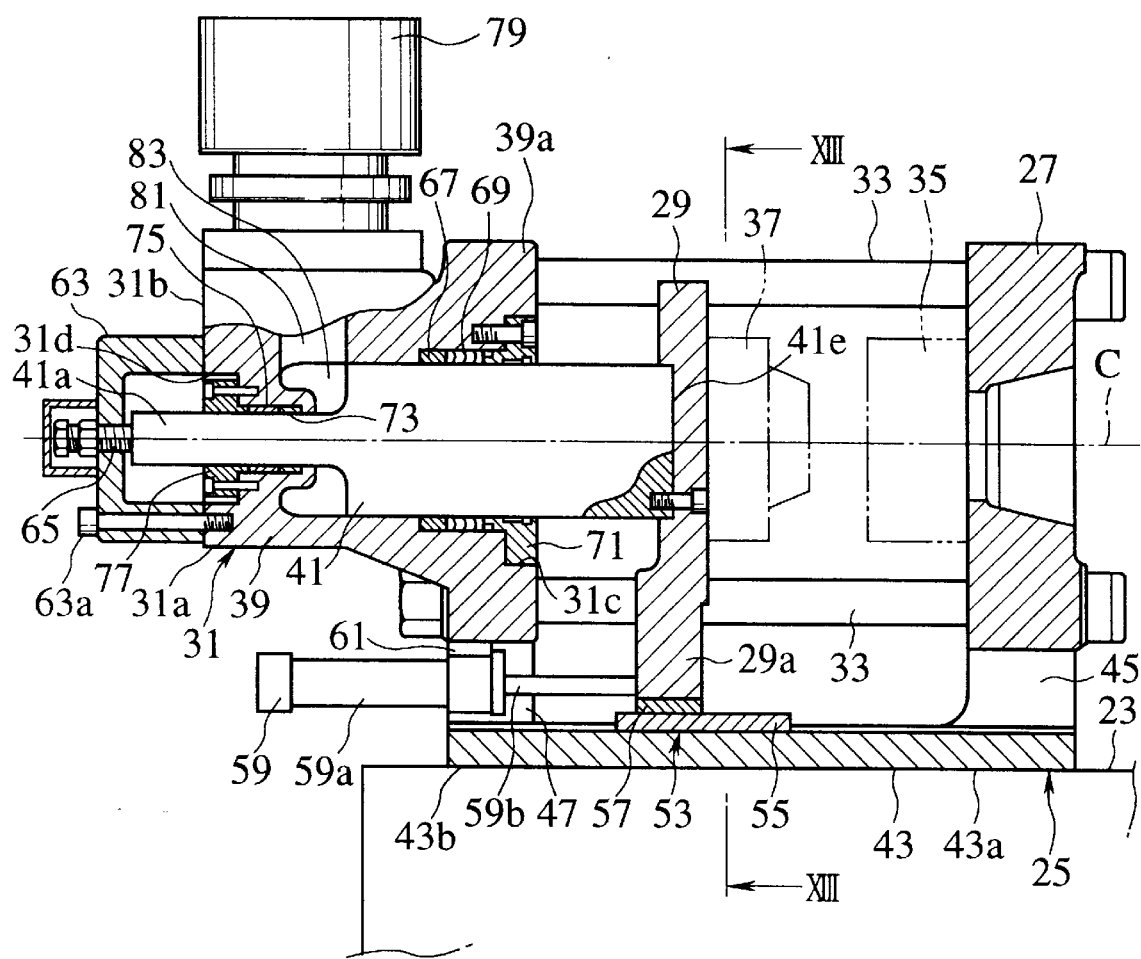
FIG. 4 is a front view, partly in section, of a clamping apparatus according to a first embodiment of the invention.
Figure 5:
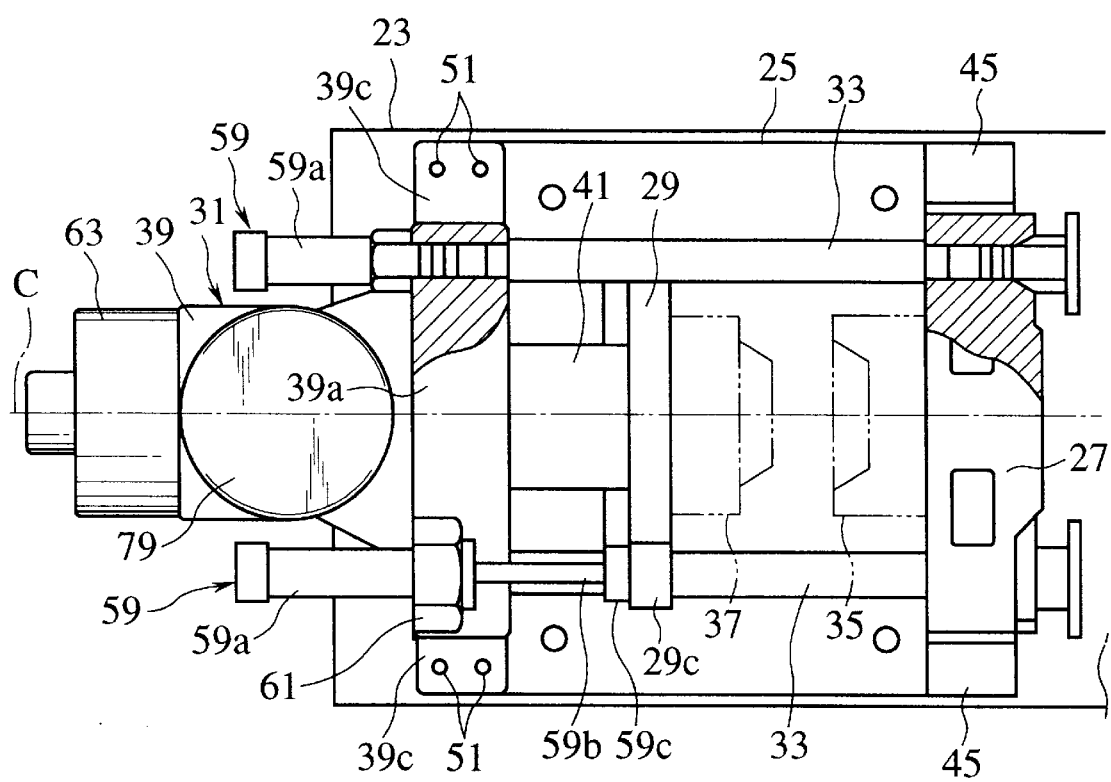
FIG. 5 is a plan view of the clamping apparatus of FIG. 4.
Figure 6:
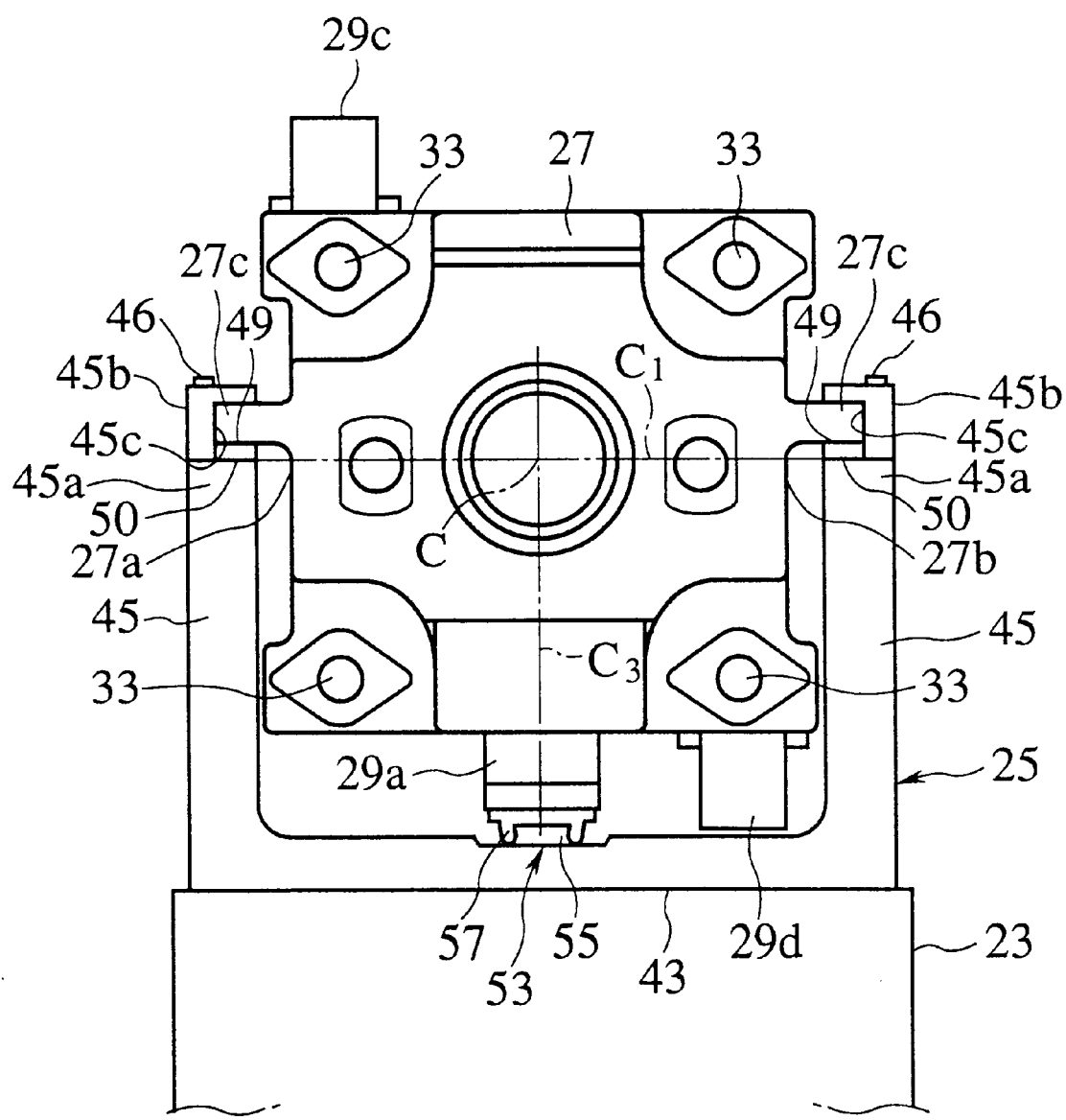
FIG. 6 is a right side view of the clamping apparatus of FIG. 4.
Figure 7:
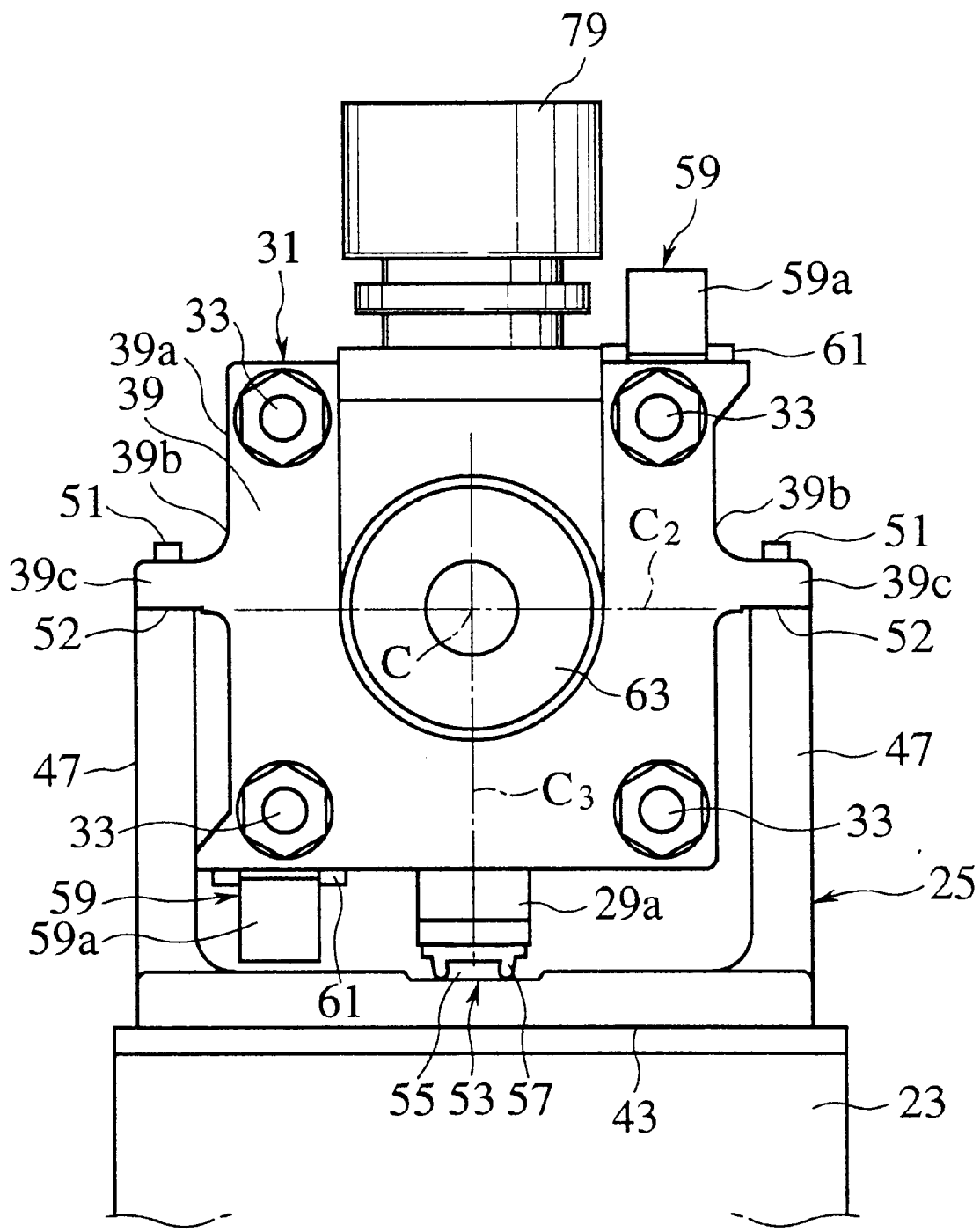
FIG. 7 is a left side view of the clamping apparatus of FIG. 4.

First, there will be described a clamping apparatus according to a first embodiment of the invention, with reference to FIGS. 4 to 8 showing the clamping apparatus, in which: FIG. 4 is a partially cutaway front elevation; FIG. 5, a plan; FIG. 6, a right side elevation; FIG. 7, a left side elevation; and FIG. 8, a XIII—XIII section of FIG. 4.

The clamping apparatus is provided as a clamping unit of an injection molding machine for an injection molding of an optical disc. The apparatus includes a mount base 25 fixedly placed on a frame 23 that constitutes a mount base of the injection molding machine. On or above the mount base 25, there are provided a stationary platen 27, a movable platen 29, and a clamp cylinder 31 as a cylinder actuator for a clamping. The stationary platen 27 and the clamp cylinder 31 are securely interconnected by four tie-rods 33 at their four corners, i.e., upper left, upper right, lower left and lower right corners in FIG. 6 or 7, respectively. The stationary platen 27 and the movable platen 29 have a stationary mold 35 and a movable mold 37 held thereto, respectively, with their positions facing each other. The clamp cylinder 31 has a cylinder body 39, in which fitted is a clamp ram 41 movable along a longitudinally extending machine centerline C, i.e. in a left-right direction in FIG. 4, which ram 41 is securely fastened at a free end 41e thereof to the movable platen 29.

The base 25 has a flat bottom portion 43, which is formed at an end part 43a thereof (at the right in FIG. 4) with a pair of support legs 45 standing upright for supporting both side parts 27a, 27b (left and right sides in FIG. 6) of the stationary platen 27 and at another end part 43b thereof (at the left in FIG. 4) with a pair of support legs 47 likewise standing for supporting both sides of the clamp cylinder 31 (see FIG. 7).

As shown in FIG. 6, the respective side parts 27a, 27b of the stationary platen 27 each have a projection 27c formed at a vertically central part thereof. On the other hand, the support legs 45 each have at an upper end part 45a thereof an L-shaped holding bracket 45b fixed thereto by a bolt 46, which bracket 45b is cooperative at an inside thereof with an upside of the leg's end part 45a to define a longitudinally extending groove 45c for receiving the projection 27c to be guided therealong for a longitudinal sliding. The projection 27c has at a downside thereof a sliding plate 49 securely sticking thereto, which plate 49 is a sintered material impregnated with oil for reducing a sliding friction against the sliding of projection 27c, as the plate 49 is inserted between the projection 27c and the upside of the upper end part 45a of leg 45. Between a bottom of the sliding plate 49 and the upside of each leg's end part 45a there is a sliding contact surface 50, which coincides with a horizontal reference plane including a centerline C1 passing vertically central points of the stationary platen 27.

In regard of the clamp cylinder 31, the cylinder body 39 includes, in a longitudinally front portion thereof or more specifically as its part at a ram insertion side of a cylinder part 31a, an integrally formed cylinder support 39a substantially rectangularly configured with four sides as shown in FIG. 7, which cylinder support 39a has on both side parts 39b thereof, at their vertically substantially central locations, a pair of projections 39c formed to be each fixed onto an upper end part of one of the support legs 47 by a pair of bolts 51 (see FIG. 5) longitudinally spaced apart from each other. Between a bottom of the projection 39c and the upper end part of leg 47 there is an abutting surface 52 coincident with the horizontal reference plane, which includes a centerline C2 passing vertically central points of the clamp cylinder 31.

In other words, the stationary platen 27 and the clamp cylinder 31 are both supported at their vertically central parts, relative to the base 25.

The movable platen 29 is movable relative to the base 25, as the platen 29 is guided by a linear guide mechanism 53 provided thereunder. The linear guide mechanism 53 comprises a single guide rail 55 integrally formed on the bottom portion 43 of the base 25 in parallel with the machine centerline C, and a roller bearing 57 seating astride the guide rail 55. The rail 55 has its widthwise center position C3 residing on a vertical reference plane, which crosses on the machine centerline C with the horizontal reference plane at right angles. The roller bearing 57 is accommodated in a holder 29a as a downward projection integrally formed on a lower central part of the movable platen 29. As the movable platen 29 is driven to move, unshown rollers of the bearing 57 roll on the rail 55 which thus bears a total weight of platen 29 loaded thereon.

Figure 8:
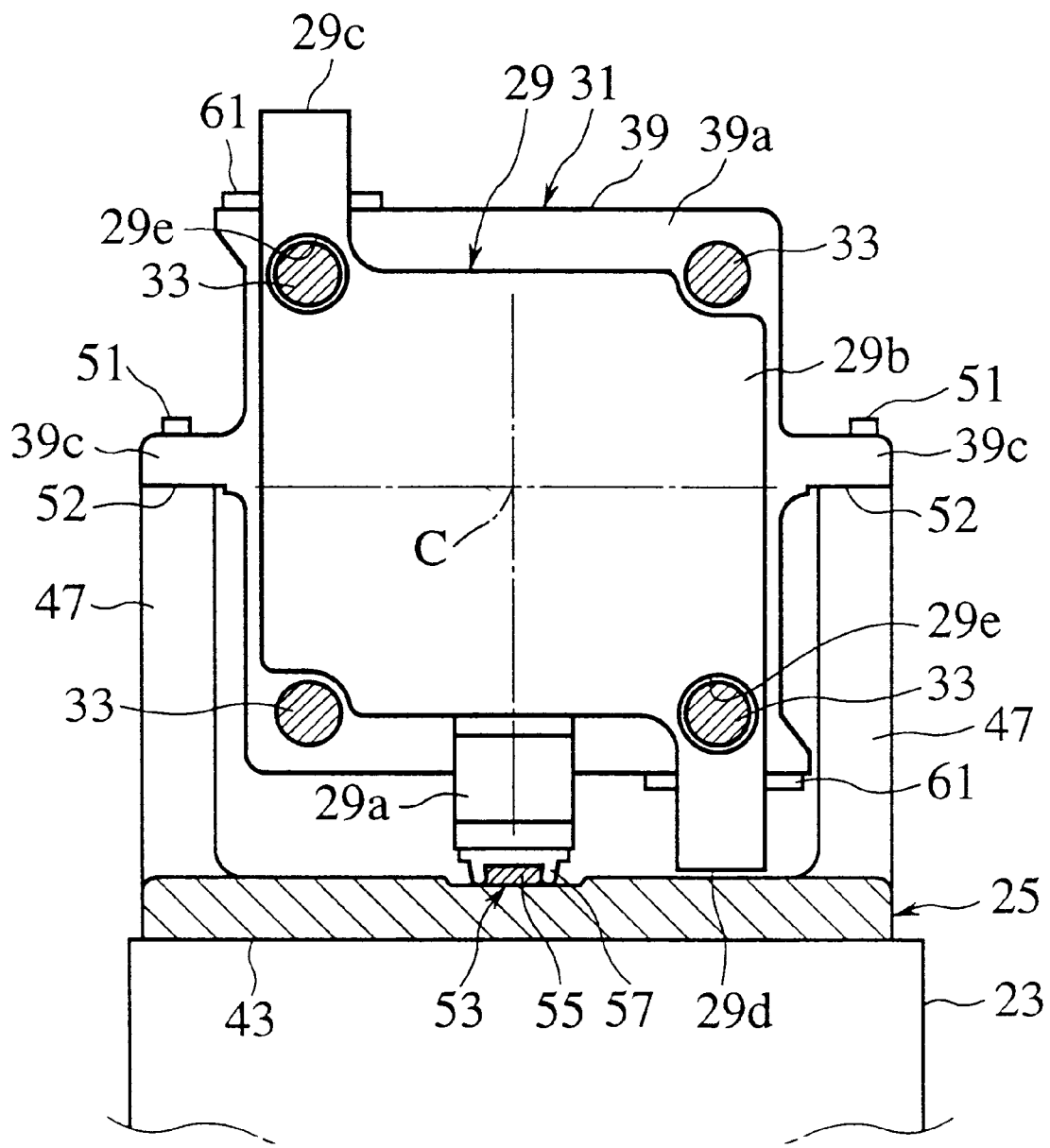
FIG. 8 is a sectional view along line VIII—VIII of the clamping apparatus of FIG. 4.

As shown in FIG. 8, the movable platen 29 comprises a main body 29b of a square plate configuration, and a pair of integrally formed bracket parts 29c, 29d diagonally arranged at upper left and lower right corners of the body 29b in the figure, respectively, and oriented to upwardly and downwardly project therefrom, respectively, for a reduced transverse width of the clamping apparatus. On the other hand, the apparatus includes a pair of longitudinally extending mold open-close cylinders 59 diagonally arranged on the clamp cylinder 31. As shown in FIGS. 4, 5 and 7, the mold open-close cylinders 59 have their cylinder bodies 59a mounted via fixing seats 61 on upper and lower edge sides of the cylinder support 39a, at locations opposing vertically mediate positions on the bracket parts 29c, 29d. Piston rods 59b of the mold open-close cylinders 59 are longitudinally slidably fitted at their base ends in the cylinder bodies 59a and securely fastened at their free ends 59c (see FIG. 5) to the projecting bracket parts 29c, 29d of the movable platen 29. This platen 29 is thus actuatable by the cylinders 59 for a mold-closing advance movement and a mold-opening retreat movement relative to the stationary platen 27.

As shown in FIG. 8, the movable platen 29 has a pair of through holes 29e formed in corner parts at base ends of the bracket parts 29c, 29d, for passing therethrough corresponding two of the four tie-rods 33. The through holes 29e have an inside diameter sufficiently larger than an-outside diameter of the tie-rods 33, which are thus loose fitted therein.

As shown in FIG. 4, the clamp ram 41 is formed at the left end in the figure with a rod part 41a projecting behind the cylinder part 31a of the clamp cylinder 31, which projection of the rod part 41a is enclosed with a cover member 63 fixed by a plurality of circumferentially arranged bolts 63a to a rear wall 31b of the cylinder part 31a. The cover member 63 has at a central part thereof a stopper bolt 65 screwed therethrough to contact at its end with a projecting end of the rod part 41a, for a limitation to leftward movements of the clamp ram 41 in the figure.

The cylinder part 31a is formed with a cylinder chamber opening toward the movable platen 29 and has at its front end, at the right end in FIG. 4 where the clamp ram 41 fits in, a stepped gap 31c defined by a circumferential wall of the cylinder chamber and an outer circumference of the ram 41, which gap 31c has at an innermost zone thereof a first annular metallic bush 67 fitted therein to serve as a guide for the clamp ram 41 to move as a piston, at a mediate zone thereof adjacent to a right side of the first bush 67 a first packing 69 fitted therein for a sealing, and at an outermost zone thereof a stopper 71 fitted therein and securely fastened to the chamber wall for stopping an inlet of the gap 31c. Further, the cylinder part 31a has at its left end in FIG. 4 where the rod part 41a of the clamp ram 41 penetrates, a rear opening formed in the rear wall 31b to have a circumferential wall cooperative with an outer circumference of the rod part 41a for defining a stepped gap 31d opening toward the cover member 63, which gap 31d has at an innermost zone thereof a second annular metallic bush 73 fitted therein to serve as a guide for the rod part 41a to slide, at a mediate zone thereof adjacent to a left side of the second bush 73 a second packing 75 fitted therein for a sealing, and at an outermost zone thereof a stopper 77 fitted therein and securely fastened to the wall of the rear opening for stopping an inlet of the gap 31d.

On the clamp cylinder 31 there is placed an oil tank 79 communicating via an oil path 81 with a hydraulic oil chamber 83 of the cylinder 31, which chamber 83 is fed with hydraulic oil from an unshown hydraulic oil circuit to drive the clamp ram 41 into a movement for the clamping between molds 35, 37. For advance and retreat movements of the ram 41 to open and close the mold, oil is let to inflow from the tank 79 to the chamber 83 or return in reverse, as it is induced or pushed back when the movable platen 29 is displaced together with the clamp ram 41 by an operation of the mold open-close cylinders 59.

Figure 9:
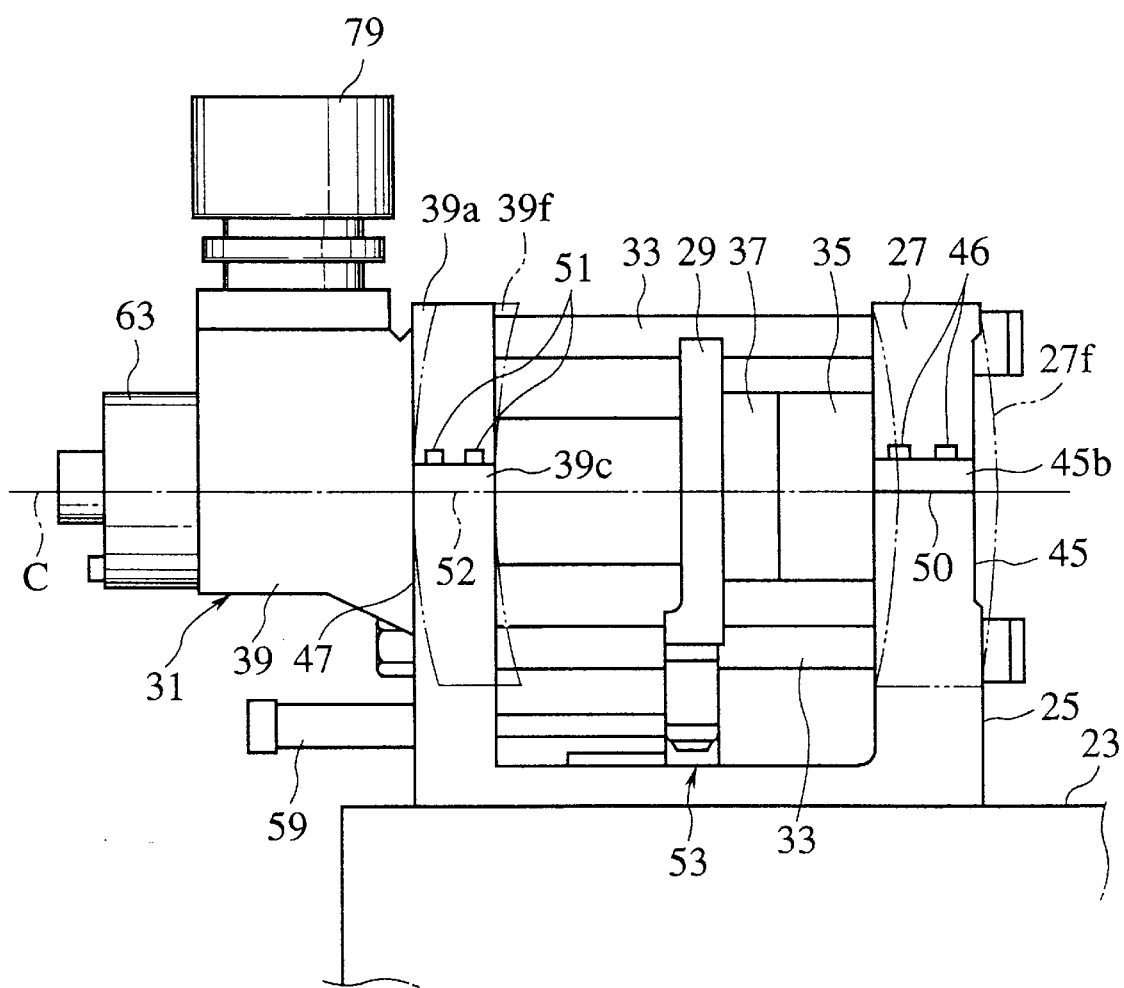
FIG. 9 is an illustration describing actions of a stationary platen and a clamp cylinder of the clamping apparatus of FIG. 4, as it has performed a clamping.

Next, there will be described principal actions of the clamping apparatus with reference to FIGS. 4 to 9, in which FIG. 9 is an illustration for explanation of the actions.

As the mold open-close cylinders 59 are operated, the movable platen 29 advances together with the clamp ram 41 toward the stationary platen 27, and in due course the movable mold 37 mates with the stationary mold 35, entering a close fitting state as shown in FIG. 9, when the oil chamber 83 of the clamp cylinder 31 is fed with hydraulic oil to drive the clamp ram 41, so that the movable platen 29 is forcibly pressed toward the stationary platen 27, providing the molds 35, 37 with a sufficient force to complete the clamping therebetween, before and after an injection of molten resin along an injection axis coincident with the machine centerline C.

Upon the clamping, a reaction force to the clamping force is born by a symmetrical combination of the four tie-rods 33, so that upper two tie-rods 33 extend with an equivalent elongation to lower two tie-rods 33 likewise extending, causing the stationary platen 27 and the cylinder support part 39a of the clamp cylinder 31 to elastically deform to some extent into configurations 27f, 39f shown by double-dashed chain lines in FIG. 9, while the stationary platen 27 is guided to follow a pulling action of the tie-rods 33, as the projections 27a at both sides of the platen 27 slide along the guiding grooves 45a. As the stationary platen 27 and the cylinder support part 39a are supported at a level of the horizontal reference plane including their centerlines C1, C2, they deform to keep a vertical symmetry with respect to the horizontal reference plane, rendering resultant deviations of a parallelism between the stationary and movable platens 27, 29 likewise symmetrical, permitting a sufficient clamping accuracy to be secured for a precise molding to produce a conforming article.

In the clamping, the movable platen 29 guided by the linear guide mechanism 53 is pushed to be displaced by the clamp ram 41 guided by the first and second metallic bushes 67, 73. Slight warps of the diagonally arranged two of four tie-rods 33 are adequately absorbed by the through holes 29e formed at diagonal locations of the movable platen 29 with a large diameter, as the two tie-rods 33 are provided therethrough, while the remaining two tie-rods 33 are disposed outside the platen 29. A due setting of size will keep the movable platen 29 from suffering warped tie-rods 33 that otherwise might provide the mold with a substantially reduced clamping accuracy.

Further, in the embodiment described, the support legs 45 for supporting the stationary platen 27 and the support legs 47 for supporting the cylinder support part 39a are integrally formed, as well as the guide rail 55 of the linear guide mechanism 53 for supporting the movable platen 29, on the mount base 25 of the clamping apparatus, thus eliminating assembly errors, permitting an improved adaptedness for a precise injection molding.

Figure 10:
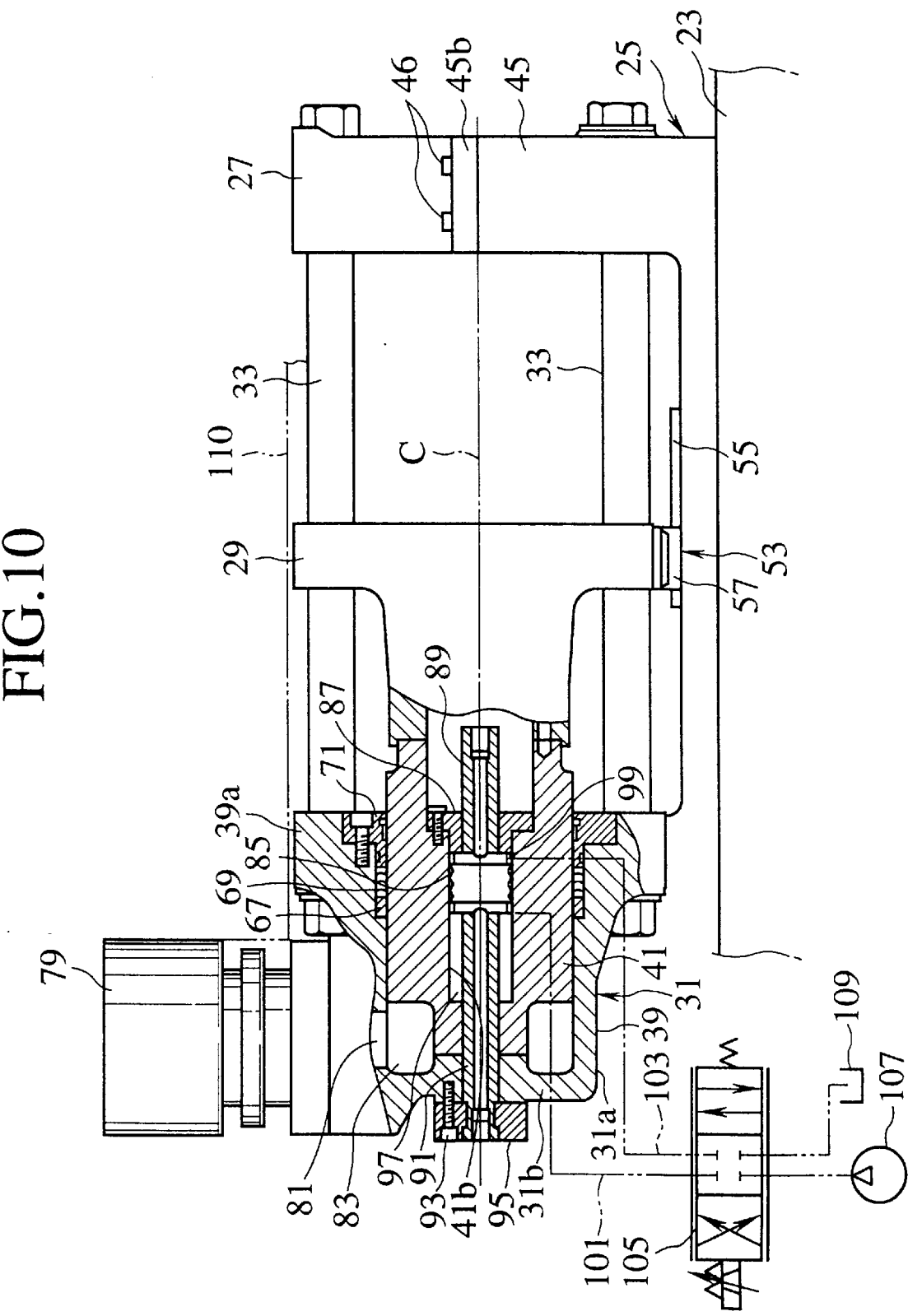
FIG. 10 is a front view of a clamping apparatus according to a second embodiment of the invention, with essential parts in section.

Next, there will be described a clamping apparatus according to a second embodiment of the invention, with reference to FIG. 10 showing a front elevation of the apparatus with essential parts in section. This clamping apparatus includes a clamp ram 41 as a piston member of a clamp cylinder 31, which clamp ram 41 is formed as a cylinder member in which a piston 85 is slidably fitted, which piston 85 is provided at front and rear sides thereof with a front rod 89 and a rear rod 91, respectively, while the rear rod 91 is fixed to a cylinder body 39 of the clamp cylinder 31 so that the clamp ram 41 is adapted to concurrently serve as a mold open-close cylinder in place of the pair of mold open-close cylinders 59 in the first embodiment, permitting these cylinders 59 to be omitted, as circumstances require.

The piston 85 is longitudinally slidably fitted in a hole 41b formed as a cylinder chamber in the clamp ram 41, which hole 41b opens at its front end facing a movable platen 29 and is stopped at the front end with a seal member 87, through which the front rod 89 of the piston 85 rightwardly extends in the figure, projecting outside with a projection length corresponding to a stroke of the clamp ram 41. On the other hand, the rear rod 91 of the piston 85 leftwardly extends in the figure, penetrating a rear wall of the clamp ram 41 and a rear wall 31b of a cylinder part 31a of the clamp cylinder 31, projecting therebehind to have its rear end fixed by a fixing member 95 which is securely fastened to the rear wall 31b of the cylinder part 31a by a bolting e.g. at 93 in the figure.

The clamp ram 41 has therein a front hydraulic oil chamber 99 defined as a fluid pressure acting space for a mold close action by a combination of the hole 41b, the front rod 89, a front side of the piston 85 and the seal member 87, and a rear hydraulic oil chamber 97 defined as a fluid pressure acting space for a mold open action by a combination of the hole 41b, the rear rod 91 and a rear side of the piston 85. The piston 85 thus faces the front oil chamber 99 at the front side and the rear oil chamber 97 at the rear side, and has its pressure receiving areas at the respective sides equalized to each other by providing the front and rear rods 89, 91 with an identical diameter. The respective oil chambers 97, 99 are connected via hydraulic oil lines 101, 103 to a servo valve 105, which is connected to a hydraulic oil pump 107 and an oil reservoir 109. As the servo valve 105 is operated to feed the rear chamber 97 with hydraulic oil, the clamp ram 41 is driven to rearwardly pull the movable platen 29 so that the platen 29 retreats away from a stationary platen 27, opening a mold. As the servo valve 105 is changed over for feeding the front chamber 99 with hydraulic oil, the movable platen 29 is pushed forward by the clamp ram 41, advancing toward the stationary platen 27, closing the mold.

According to the second embodiment, it is not always necessary to employ an arrangement of the first embodiment including a pair of mold open-close cylinders 59 disposed outside of principal machine members such as tie-rods 33, and a pair of diagonal projections 29c, 29d provided for fixation of piston rods 59b. Therefore, in the second embodiment, an outer cover 110 is permitted to be designed compact with a facilitated improvement of appearance. Moreover, in a mold open-close action, the clamp ram 41 is driven to actuate the movable platen 29, permitting forces to be applied in a point-symmetrical manner with respect to a machine centerline C. Further, the ram 41 is commonly used to clamp a mold and to close and open the mold, permitting a smooth transition of actions from a mold close action via a clamping to a mold open action, with an improved controllability. Still more, the piston 85 has an equalized pressure receiving area at both sides thereof, allowing the use of a servo valve 105 excellent in response performance for a changeover from a high speed to a low speed, permitting a time-reduced low-speed period for a mold clamping to render short one cycle of an injection molding, saving time, with an increased cost effect in production of a molded article.

Figure 11:
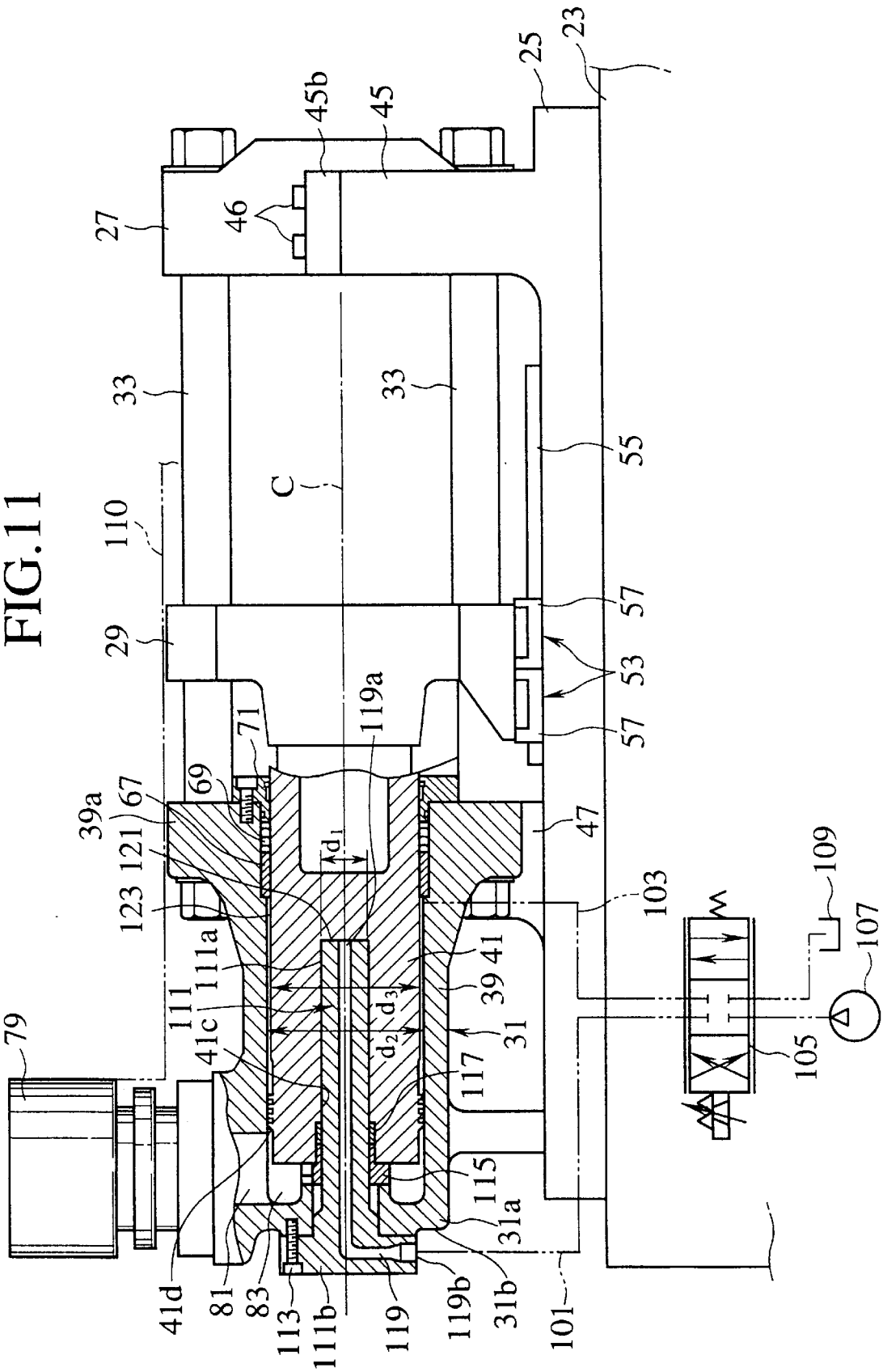
FIG. 11 is a front view of a clamping apparatus according to a third embodiment of the invention, with essential parts in section.

Next, there will be described a clamping apparatus according to a third embodiment of the invention, with reference to FIG. 11 showing a front elevation of the apparatus with essential parts in section. In this clamping apparatus, a clamp cylinder 31 includes a medium-diameter rod 111 as a single guide member corresponding to a combination of a piston 85 and front and rear rods 89 of the second embodiment, and a clamp ram 41 as a large-diameter rod formed with a piston part 41d to have a hydraulic oil chamber 123 provided at a front side of the piston part 41d in addition to a hydraulic oil chamber 83 provided at a rear side thereof, while the medium-diameter rod 111 is inserted through a central part of a rear wall 31b of a cylinder part 31a into a hole 41c formed as a cylinder chamber in the clamp ram 41, where it is slidable relative to a chamber wall.

The rod 111 has a front rod part 111a thereof fitted in the hole 41c, and a rear fixed part 111b securely fastened from outside to the rear wall 31b of the cylinder part 31a by a bolting e.g. at 113 in the figure.

The hole 41c is open at its left end in the figure, where it has a circumferential groove formed therearound, where it has fitted a seal member 115 for sealing a clearance around the rod part 111a oil-tight and an annular metallic bush 117 located at an axially inner side of the seal member 115 to serve as a guide when the clamp ram 41 moves.

The medium-diameter rod 111 has a hydraulic oil path 119 formed therethrough to provide a passage for hydraulic fluid, as it is externally supplied at a lateral side of the fixed part 111b. The oil path 119 communicates at its end 119a on the rod part 111a side with a hydraulic oil chamber 121 defined as a fluid pressure acting space for a mold close action between an end face of the rod part 111a and the wall of the hole 41c, and is connected at its end 119b on the fixed part 111b side via a hydraulic oil line 101 to a servo valve 105. On the other hand, between an inner circumference of the cylinder part 31a and an outer circumference of the clamp ram 41, there is defined the hydraulic oil chamber 123 as a fluid pressure acting space for a mold open action, which chamber 123 is connected via a hydraulic oil line 103 to the servo valve 105.

As the servo valve 105 is operated to feed hydraulic oil to the oil chamber 123 for the mold open action, the clamp ram 41 is driven to actuate a movable platen 29 so that the platen 29 retreats away from a stationary platen 27, opening a mold. As the servo valve 105 is changed over for feeding hydraulic oil to the oil chamber 121 for the mold close action, the movable platen 29 is actuated by the clamp ram 41 to advance toward the stationary platen 27, closing the mold.

In the mold close action of the clamp ram 41, the oil chamber 121 exerts hydraulic pressures on a pressure receiving area of the rod part 111a. In the mold open action, the oil chamber 123 exerts hydraulic pressures on a pressure receiving area of the piston part 41d. Letting S1 be the pressure receiving area of the rod part 111a, and S2 be that of the piston part 41d, the areas S1 and S2 are preset to be equivalent to each other, such that:

$S1 = \pi(d_1/2)^2 = \pi d_1^2/4$, $S2 = (\pi d_2^2/4) - (\pi d_3^2/4)$, and $S1 = S2$, thus $d_1^2 = d_2^2 - d_3^2$, where, $d_1$ is an inside diameter of the hole 41c, $d_2$ is an inside diameter of the oil chambers 83 and 123, and $d_3$ is an outside diameter of the clamp ram 41.

In this embodiment also, in mold open-close actions, the clamp ram 41 is driven to actuate the movable platen 29, permitting forces to be applied in a symmetrical manner with respect to a machine centerline C.

Moreover, the rod part 111a facing the oil chamber 121 and the piston part 41d facing the oil chamber 123 have an equalized pressure receiving area S1, S2, allowing the use of a servo valve 105 excellent in response performance for a changeover from a high speed to a low speed, permitting a time-reduced low-speed period for a mold clamping to render short one cycle of an injection molding, saving time, with an increased cost effect in production of a molded article, like the second embodiment.

Further, the annular metallic bush 117 interposed between the clamp ram 41 and the rod 111 fitted therein cooperates with an annular metallic bush 67 interposed between the cylinder part 31a of the clamp cylinder 31 and the clamp ram 41 fitted therein to guide the ram 41 with a high accuracy when the ram 41 is driven to actuate the movable platen 29 for a movement relative to the stationary platen 27, permitting an improved parallelism between the platens 27, 29.

Figure 12:
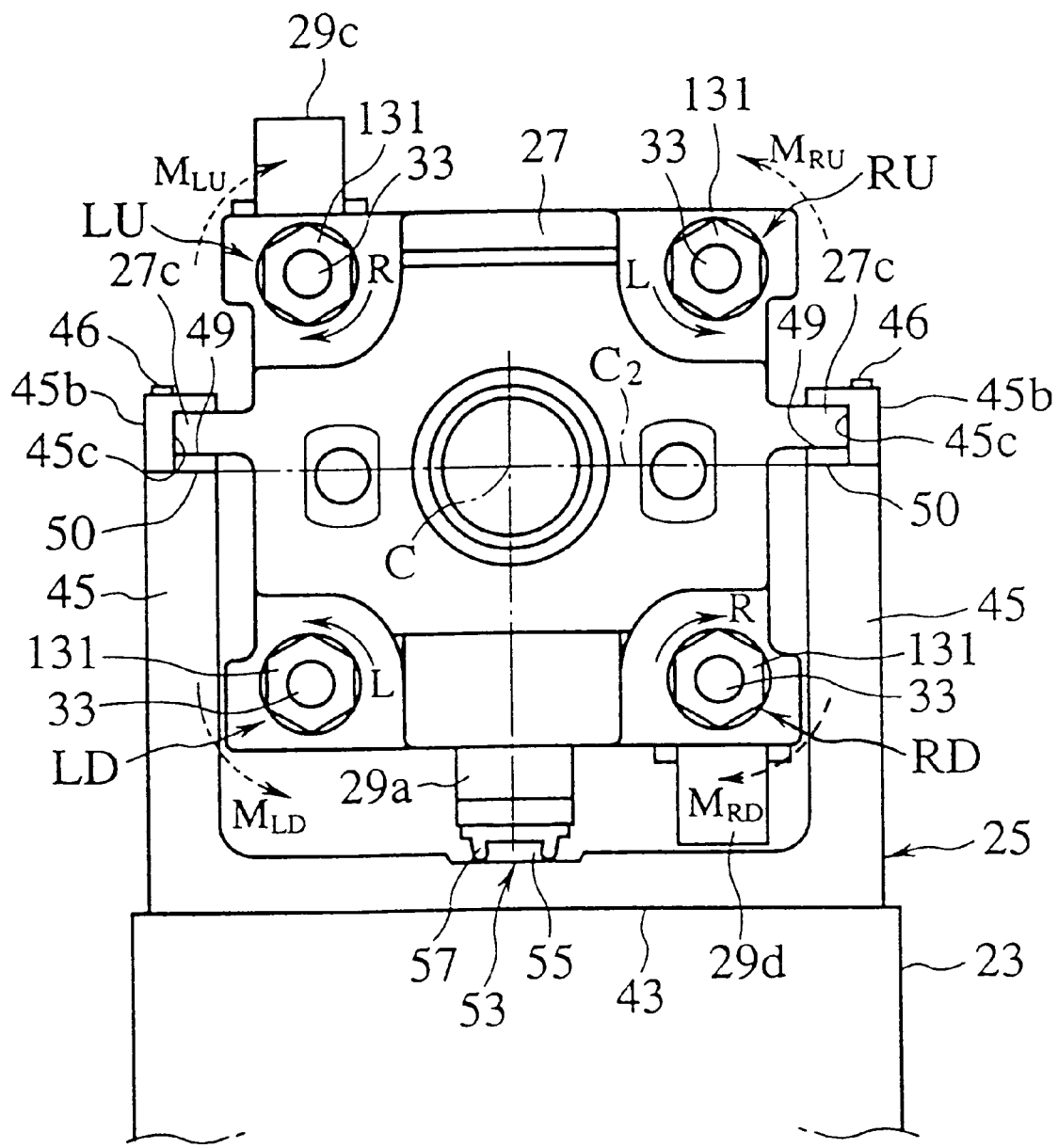
FIG. 12 is a side view of a clamping apparatus according to a fourth embodiment of the invention.

Next, there will be described a clamping apparatus according to a fourth embodiment of the invention, with reference to FIGS. 4 and 12 to 14, in which: FIG. 12 is a side elevation of the clamping apparatus; and FIGS. 13 and 14, details thereof, respectively. This clamping apparatus is different from the first embodiment (see FIG. 4) simply in tightening structure of tie-rods 33.

Figure 13:
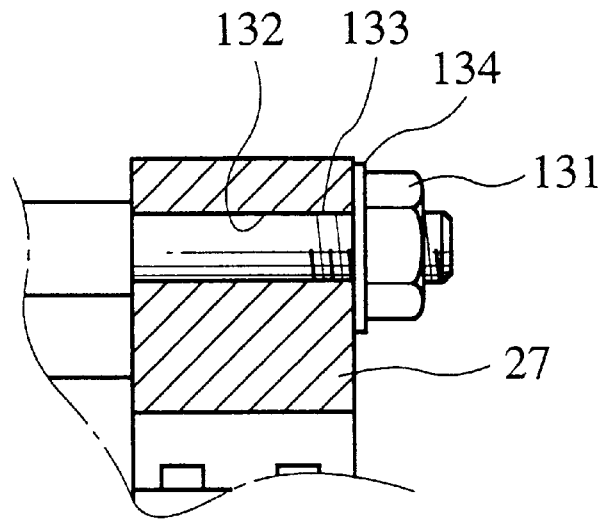
FIGS. 13 and 14 are sectional views of essential parts of the clamping apparatus of FIG. 12, respectively.

As shown in FIG. 4 and/or FIG. 12, a cylinder body 39 of a clamp cylinder 31 includes a cylinder support part 39a as a front part thereof, which is connected to a stationary platen 27 by the tie-rods 33, four in total, arranged about a stationary mold 35 and a movable mold 37 at locations corresponding to four corners of the stationary platen 27. As shown in FIG. 13, at the stationary platen 27 side, an end portion of each tie-rod 33 is diameter-reduced to be inserted into a through hole 132 so that a male thread part 133 formed at its end projects at an opposite side of the stationary platen 27, which projection is securely fastened by a nut 131 as a fastening member to the platen 27, with a washer 134 inserted therebetween.

As shown in FIG. 12, the four tie-rods 33 are thus fastened to the platen 27 by a total of four nuts 131, of which arbitrary two neighboring along a periphery of the platen 27 have their screw tightening directions different from each other. In other words, of the four nuts 131 disposed on a four-sided rectangular configuration of the platen 27, diagonally opposing two have their tightening directions identical to each other. More specifically, in a layout shown in FIG. 12, upper left and lower right ones of the nuts 131 constitute a pair of fastening parts LU, RD having typical righthanded screws to be tightened in a righthanded rotational direction shown by a solid-line arrow R, and upper right and lower left ones constitute a pair of fastening parts RU, LD having lefthanded screws to be tightened in a lefthanded rotational direction shown by a solid-line arrow L.

Figure 14:
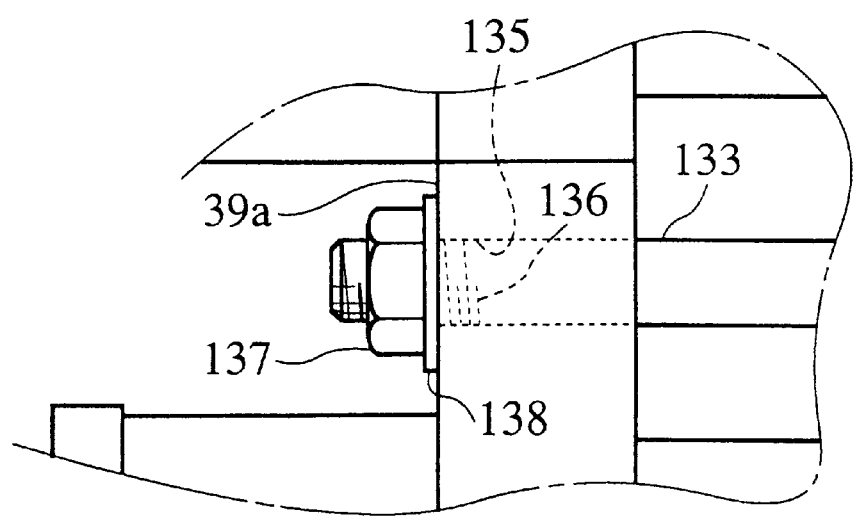

As shown in FIG. 14, at the cylinder support part 39a side also, an end portion of each tie-rod 33 is diameter-reduced to be inserted into a through hole 135 so that a male thread part 136 formed at its end projects at an opposite side of the cylinder support part 39a, which projection is securely fastened by a nut 137 to the cylinder support part 39a, with a washer 138 inserted therebetween. At both ends of each tie-rod 33, the male thread parts 133 and 136 have like screw directions to each other. In other words, for any tie-rod 33, the thread parts 133, 136 are both righthanded or both lefthanded.

In FIG. 12, arbitrary two nuts 131 neighboring along the periphery of the stationary platen 27 have different tightening directions, as described. Therefore, when tightening, the four fastening parts LU, LD, RD, RU exert on the platen 27 corresponding moments shown by broken-line arrows $M_{RU}$, $M_{LD}$, $M_{RD}$, $M_{RU}$, respectively, of which arbitrary two at neighboring locations along the periphery of the platen 27 have their acting directions different from each other. Thus, the moments $M_{RU}$, $M_{LD}$, $M_{RD}$, $M_{RU}$ cancel out each other as a total. At both ends of each tie-rod 33, the nuts 131 and 137 have like tightening directions to each other. Accordingly, at the cylinder support part 39a side also, four nuts 137 exert mutually cancelling moments on the cylinder body 39.

As a result, both the stationary platen 27 and the cylinder body 39 receive mutually cancelling moments exerted thereon by tightening the four nuts 131 and 137, respectively. It therefore is facilitated to achieve a parallelism between the stationary platen 27 and the cylinder body 39, as well as their perpendicularities to the tie-rods 33, permitting a reduced warp, leading to a facilitated establishment of parallelism between the stationary platen 27 and the movable platen 29, and an improved assembly accuracy, with an increased adaptivity in particular to a precise injection molding for production of an optical disc, such as a compact disc or digital video disc, needing a high accuracy.

The fourth embodiment may preferably be applied to the second or third embodiment also.

It will be understood that the foregoing embodiments each serve for a clamping apparatus in which stationary and movable platens 27, 29 respectively hold stationary and movable molds 35, 37 centered to a machine centerline C, to symmetrize various deformations the platens 27, 39 exercise when the molds 35, 37 are clamped, i.e., to make the deformations symmetrical with respect to the centerline C or to achieve a rotation symmetry or a reflection symmetry, alone or in combination, avoiding a reduction of clamping accuracy due to such deformations.

It will also be seen that horizontal and/or vertical reference planes may be rotated about a machine centerline C at a voluntary angle.

While preferred embodiments of the present invention have been described using specific terms, such description is for illustrative purposes, and it is to be understood that changes and variations may be made without departing from the spirit or scope of the following claims.

What is claimed is:

1. A clamping apparatus for clamping a mold in a clamp direction thereof, the clamping apparatus being mounted on a base frame, the clamping apparatus comprising:

a stationary platen for holding a stationary part of the mold;

a movable platen for holding a movable part of the mold;

a clamp cylinder for moving the movable platen in the clamp direction;

a cylinder body integral with a cylinder part of the clamp cylinder;

a tie-rod for securely connecting an upper part of the stationary platen to an upper part of the cylinder body;

a tie-rod for securely connecting a lower part of the stationary platen to a lower part of the cylinder body;

first means for fixing a central part of the cylinder body between the upper and lower parts thereof relative to the base frame; and second means for supporting a central part of the stationary platen between the upper and lower parts thereof to be slidable in the clamp direction relative to the base frame.

2. A clamping apparatus according to claim 1, wherein:

the cylinder body has a cylinder support part extending along a vertical plane crossing the clamp direction;

the first means comprises:
a pair of first projections provided at both lateral sides of the cylinder support part;
a pair of first legs fixed relative to the base frame; and
a first mechanism for fixing the pair of first projections to the pair of first legs; and the second means comprises:
a pair of second projections provided at both lateral sides of the stationary platen;
a pair of second legs fixed relative to the base frame; and a second mechanism for holding the pair of second projections to the pair of second legs, to be slidable in the clamp direction.

3. A clamping apparatus for clamping a mold in a clamp direction thereof, the clamping apparatus being mounted on a base frame, the clamping apparatus comprising:

a stationary platen for holding a stationary part of the mold;

a mechanism for supporting the stationary platen to be slidable in the clamp direction;

a movable platen for holding a movable part of the mold;

a clamp cylinder for moving the movable platen;

a cylinder body integral with a cylinder part of the clamp cylinder;

a mechanism for fixing the cylinder body relative to the base frame;

a tie-rod for securely connecting the movable platen to the cylinder body; and means for guiding the movable platen in the clamp direction, the means comprising:
 a clamp ram fitted to the cylinder part;
 a bush member fitted between the cylinder part and the clamp ram; and
 a linear guide mechanism interposed between the movable platen and the base frame.

4. A clamping apparatus for clamping a mold in a clamp direction thereof, the clamping apparatus being mounted on a base frame, the clamping apparatus comprising:

a stationary platen for holding a stationary part of the mold;

a movable platen for holding a movable part of the mold;

a clamp cylinder for moving the movable platen;

a cylinder body integral with a cylinder part of the clamp cylinder, the cylinder body having a cylinder support part extending along a vertical plane crossing the clamp direction;

a tie-rod for securely connecting an upper part of the stationary platen to an upper part of the cylinder body;

a tie-rod for securely connecting a lower part of the stationary platen to a lower part of the cylinder body;

first means for fixing a central part of the cylinder body between the upper and lower parts thereof relative to the base frame, the first means comprising a pair of first projections provided at both lateral sides of the cylinder support part, a pair of first legs fixed relative to the base frame, and a first mechanism for fixing the pair of first projections to the pair of first legs;

second means for supporting a central part of the stationary platen between the upper and lower parts thereof to be slidable in the clamp direction relative to the base frame, the second means comprising a pair of second projections provided at both lateral sides of the stationary platen, a pair of second legs fixed relative to the base frame, and a second mechanism for holding the pair of second projections to the pair of second legs, to be slidable in the clamp direction;

third means for guiding the movable platen in the clamp direction, the third means comprising a clamp ram fitted to the cylinder part, a bush member fitted between the cylinder part and the clamp ram, and a linear guide mechanism interposed between the movable platen and the base frame; and a base member fixed to the base frame, the base member being integral with the pair of first legs and the pair of second legs, the base member supporting the linear guide mechanism.

5. A clamping apparatus for clamping a mold in a clamp direction thereof, the clamping apparatus being mounted on a base frame, the clamping apparatus comprising:

a stationary platen for holding a stationary part of the mold;

a mechanism for supporting the stationary platen to be slidable in the clamp direction;

a movable platen for holding a movable part of the mold;

a clamp cylinder for moving the movable platen in the clamp direction;

a cylinder body integral with a cylinder part of the clamp cylinder;

a mechanism for fixing the cylinder body relative to the base frame;

a tie-rod for securely connecting the stationary platen to the cylinder body; and means for closing the mold in the clamp direction and opening the same in a reverse direction thereto, the means comprising:
 a clamp ram fitted in the cylinder part;
 a piston member fitted in the clamp ram;
 a mechanism for fixing the piston member to the cylinder body; and
 the movable platen being connected to the clamp ram.

6. A clamping apparatus according to claim 5, wherein:

the piston member comprises a piston slidable relative to a cylinder chamber in the clamp ram, a first rod provided on one side of the piston, the first rod projecting outside of the cylinder chamber, and a second rod provided on the other side of the piston, the second rod projecting outside of the cylinder chamber;

said means has pressure fluid circuitry adaptive for driving the clamp ram in the clamp direction and in the reverse direction, the pressure fluid circuitry including:
 a first pressure acting chamber defined by the cylinder chamber, the piston and the first rod; and
 a second pressure acting chamber defined by the cylinder chamber, the piston and the second rod; and the first and second rods have an identical cross sectional area to each other.

7. A clamping apparatus for clamping a mold in a clamp direction thereof, the clamping apparatus being mounted on a base frame, the clamping apparatus comprising:

a stationary platen for holding a stationary part of the mold;

a mechanism for supporting the stationary platen to be slidable in the clamp direction;

a movable platen for holding a movable part of the mold;

a clamp cylinder for moving the movable platen in the clamp direction;

a cylinder body integral with a cylinder part of the clamp cylinder;

a mechanism for fixing the cylinder body relative to the base frame;

a tie-rod for securely connecting the stationary platen to the cylinder body; and means for closing the mold in the clamp direction and opening the same in a reverse direction thereto, the means comprising:
 a first cylinder chamber formed in the cylinder part;
 a clamp ram loose-fitted in the first cylinder chamber;
 the movable platen being connected to the clamp ram;

a second cylinder chamber formed in the clamp ram;

a rod member slidably fitted in the second cylinder chamber;

a mechanism for fixing the rod member to the cylinder body; and pressure fluid circuitry adaptive for driving the clamp ram in the clamp direction and in the reverse direction, the pressure fluid circuitry including:

a first pressure acting chamber defined by the first cylinder chamber, an outer circumferential part of the clamp ram, and a piston part on the outer circumferential part of the clamp ram;

a second pressure acting chamber defined by the second cylinder chamber, and an end face of the rod member; and a fluid path formed in the rod member, the fluid path communicating with the second pressure acting chamber.

8. A clamping apparatus according to claim 7, wherein the first and second pressure acting chambers have an identical cross sectional area to each other.

9. A clamping apparatus according to claim 7, further comprising guide means for guiding the movable platen in the clamp direction, the guide means including:

a first bush member interposed between the cylinder part and and the clamp ram; and a second bush member interposed between the clamp ram and the rod member.

10. A clamping apparatus for clamping a mold in a clamp direction thereof, the clamping apparatus comprising:

a stationary platen for holding a stationary part of the mold;

a clamp cylinder for moving a movable part of the mold in the clamp direction;

a cylinder body integral with a cylinder part of the clamp cylinder;

a first tie-rod and a second tie-rod for connecting the stationary platen to the cylinder body, respectively; and means for securely fastening the first tie-rod and the second tie-rod to a peripheral part of the stationary platen, the means comprising;

a first thread part formed at an end of the first tie-rod;

a first fastening member engageable with the first thread part in a first rotational direction;

a second thread part formed at an end of the second tie-rod; and a second fastening member engageable with the second thread part in a second rotational direction different from the first rotational direction.

11. A clamping apparatus according to claim 10, wherein:

the peripheral part of the stationary platen has a rectangular form;

the first tie-rod is arranged at a first corner of the rectangular form; and the second tie-rod is arranged at a second corner of the rectangular form adjacent to the first corner.

12. A clamping apparatus according to claim 10, wherein:

the first thread part comprises a first male thread;

the first fastening member comprises a nut screwable to the first male thread;

the second thread part comprises a second male thread different from the first male thread in screw direction; and the second fastening member comprises a nut screwable to the second male thread.

13. A clamping apparatus mounted on a base frame, for clamping a mold in a clamp direction thereof, the mold being centered to an injection axis, the clamping apparatus comprising:

a stationary platen for holding a stationary part of the mold;

a clamp cylinder for moving a movable part of the mold in the clamp direction;

a cylinder body integral with a cylinder part of the clamp cylinder;

a plurality of tie-rods for securely connecting the stationary platen to the cylinder body;

first symmetrization means for making a deformation of the stationary platen due to clamping symmetrical with respect to a reference plane including the injection axis, the first symmetrization means comprising first support means for fixing, in the reference plane, a central part of the cylinder body between upper and lower parts thereof relative to the base frame, and second support means for supporting, in the reference plane, a central part of the stationary platen between upper and lower parts thereof to be slidable in the clamp direction relative to the base frame.

14. A clamping apparatus according to claim 13, wherein:

the plurality of tie-rods includes a first tie-rod and a second tie-rod symmetrical to each other with respect to the injection axis; and the first symmetrization means further comprises fastening means for securely fastening the first tie-rod and the second tie-rod to a peripheral part of the stationary platen, the fastening means comprising:

a first thread part formed at an end of the first tie-rod;

a first fastening member engageable with the first thread part in a first rotational direction;

a second thread part formed at an end of the second tie-rod; and a second fastening member engageable with the second thread part in a second rotational direction different from the first rotational direction.

15. A clamping apparatus according to claim 13, further comprising:

a movable platen for holding a movable part of the mold;

the clamp cylinder being operable for moving the movable platen to move the movable part of the mold in the clamp direction; and second symmetrization means for making a deformation of the movable platen due to the clamping symmetrical with respect to the reference plane.

16. A clamping apparatus according to claim 15, wherein:

the clamping apparatus is mounted on a base frame;

the clamping apparatus further comprises a mechanism for supporting the stationary platen to be slidable in the clamp direction, and a mechanism for fixing the cylinder body relative to the base frame; and the second symmetrization means comprises guide means for guiding the movable platen in the clamp direction, the guide means comprising:

a clamp ram fitted to the cylinder part;

a bush member fitted between the cylinder part and the clamp ram; and a linear guide mechanism interposed between the movable platen and the base frame.

17. A clamping apparatus according to claim 15, wherein:

the clamping apparatus is mounted on a base frame;

the clamping apparatus further comprises a mechanism for supporting the stationary platen to be slidable in the clamp direction, and a mechanism for fixing the cylinder body relative to the base, frame; and the second symmetrization means comprises actuation means for closing the mold in the clamp direction and opening the same in a reverse direction thereto, the actuation means comprising:
   a clamp ram fitted in the cylinder part;
   a piston member fitted in the clamp ram;
   a mechanism for fixing the piston member to the cylinder body; and
   the movable platen being connected to the clamp ram.

18. A clamping apparatus according to claim 15, wherein:

the clamping apparatus is mounted on a base frame;

the clamping apparatus further comprises a mechanism for supporting the stationary platen to be slidable in the clamp direction, and a mechanism for fixing the cylinder body relative to the base frame; and the second symmetrization means comprises actuation means for closing the mold in the clamp direction and opening the same in a reverse direction thereto, the actuation means comprising:
   a first cylinder chamber formed in the cylinder part;
   a clamp ram loose-fitted in the first cylinder chamber;
   the movable platen being connected to the clamp ram;
   a second cylinder chamber formed in the clamp ram;
   a rod member slidably fitted in the second cylinder chamber;
   a mechanism for fixing the rod member to the cylinder body; and
   pressure fluid circuitry adaptive for driving the clamp ram in the clamp direction and in the reverse direction, the pressure fluid circuitry including:
      a first pressure acting chamber defined by the first cylinder chamber, an outer circumferential part of the clamp ram, and a piston part on the outer circumferential part of the clamp ram;
      a second pressure acting chamber defined by the second cylinder chamber, and an end face of the rod member; and
      a fluid path formed in the rod member, the fluid path communicating with the second pressure acting chamber.

19. A clamping apparatus mounted on a base frame, for clamping a mold in a clamp direction thereof, the mold being centered to an injection axis, the clamping apparatus comprising:
   a stationary platen for holding a stationary part of the mold;
   a clamp cylinder for moving a movable part of the mold in the clamp direction;
   a cylinder body integral with a cylinder part of the clamp cylinder;
   a plurality of tie-rods for securely connecting the stationary platen to the cylinder body, the plurality of tie-rods including an upper tie-rod for securely connecting an upper part of the stationary platen to an upper part of the cylinder body and a lower tie-rod for securely connecting a lower part of the stationary platen to a lower part of the cylinder body; and
   first symmetrization means for making a deformation of the stationary platen due to clamping symmetrical with respect to a reference plane including the injection axis, the first symmetrization means comprising first support means for fixing, in the reference plane, a central part of the cylinder body between the upper and lower parts thereof relative to the base frame, and second support means for supporting, in the reference plane, a central part of the stationary platen between the upper and lower parts thereof to be slidable in the clamp direction relative to the base frame.

* * * * *